United States Patent
Nishiwaki et al.

(10) Patent No.: US 8,045,432 B2
(45) Date of Patent: Oct. 25, 2011

(54) OPTICAL DISC DEVICE

(75) Inventors: Seiji Nishiwaki, Hyogo (JP); Kazuo Momoo, Osaka (JP); Junichi Asada, Hyogo (JP)

(73) Assignee: Panasonic Corporation, Osaka (JP)

( * ) Notice: Subject to any disclaimer, the term of this patent is extended or adjusted under 35 U.S.C. 154(b) by 343 days.

(21) Appl. No.: 12/296,822

(22) PCT Filed: Mar. 19, 2007

(86) PCT No.: PCT/JP2007/055523
§ 371 (c)(1),
(2), (4) Date: Oct. 10, 2008

(87) PCT Pub. No.: WO2007/116631
PCT Pub. Date: Oct. 18, 2007

(65) Prior Publication Data
US 2009/0279403 A1    Nov. 12, 2009

(30) Foreign Application Priority Data
Apr. 12, 2006   (JP) .................. 2006-109497

(51) Int. Cl.
*G11B 7/00* (2006.01)
(52) U.S. Cl. .......... 369/53.12; 369/112.01; 369/112.03; 369/112.05; 369/112.06; 369/112.15
(58) Field of Classification Search ............... 369/53.12, 369/44.29, 44.23, 53.28, 112.01, 112.05, 369/112.06, 112.15
See application file for complete search history.

(56) References Cited

U.S. PATENT DOCUMENTS

| | | | |
|---|---|---|---|
| 5,886,964 A | 3/1999 | Fujita | |
| 6,144,623 A | 11/2000 | Inoue et al. | |
| 2001/0055248 A1* | 12/2001 | Nagata et al. | 369/44.41 |
| 2004/0228236 A1* | 11/2004 | Sakai et al. | 369/44.41 |
| 2005/0047292 A1* | 3/2005 | Park et al. | 369/44.37 |
| 2005/0088950 A1 | 4/2005 | Tanimoto | |
| 2005/0180293 A1* | 8/2005 | Ueyama et al. | 369/112.05 |
| 2005/0199778 A1 | 9/2005 | Kadowaki et al. | |
| 2005/0281141 A1 | 12/2005 | Ono | |
| 2009/0316550 A1* | 12/2009 | Choi et al. | 369/53.28 |

FOREIGN PATENT DOCUMENTS

| | | |
|---|---|---|
| CN | 1192024 | 9/1998 |
| JP | 9-81942 | 9/1997 |
| JP | 2000-133929 | 5/2000 |
| JP | 2003-331437 | 11/2003 |
| JP | 2003331437 A * | 11/2003 |
| JP | 2004-281026 | 10/2004 |
| JP | 2005-122869 | 5/2005 |
| JP | 2005-317063 | 11/2005 |
| JP | 2006-12213 | 1/2006 |

* cited by examiner

*Primary Examiner* — Wayne Young
*Assistant Examiner* — Brenda Bernardi
(74) *Attorney, Agent, or Firm* — Hamre, Schumann, Mueller & Larson, P.C.

(57) ABSTRACT

Light emitted from a radiation light source 1 passes through a diffraction grating 3a and is separated into transmitted light a and +1st/−1st order diffracted lights b, c. These lights are collected through an objective lens 7 on tracks of an optical disc 8 in a partially overlapped state. Light reflected by the tracks passes through the objective lens 7 and is incident upon light diverging means 13a. Subsequently, light corresponding to the transmitted light "a" diverges into two light beams that are respectively incident upon light detection regions A1, A2, light corresponding to the diffracted lights "b" and "c" respectively diverges into two light beams that are respectively incident upon light detection regions B1, B2, and C1, C2. A tracking error signal associated with the tracks of the optical disc 8 is generated by combining signals detected in the light detection regions A1, A2, B1, B2, C1, and C2.

11 Claims, 10 Drawing Sheets

(a)

(b)

(a)

(b)

OPTICAL DISC DEVICE

TECHNICAL FIELD

The present invention relates to an optical disc device used for recording signals on an optical disc or reproduction signals recorded on an optical disc.

BACKGROUND ART

Conventionally, as such an optical disc device, the one disclosed in Patent document 1 has been known, for example. Based on this precedent with a part thereof being modified, the following description is made with reference to FIGS. 8-10.

FIG. 8(a) is a side view illustrating an optical disc device based on the conventional technology, FIG. 8(b) is a diagram illustrating a grating pattern formed on a grating surface used in the optical disc device, as well as the distribution of light on the grating surface, and FIG. 8(c) is a diagram illustrating the configuration of a signal plane of an optical disc and the distribution of light on the signal plane.

As shown in FIG. 8, upon successively passing through a transparent substrate 3 and the split plane 4a of a polarizing beam splitter 4, laser light 2 emitted from a radiation light source 1, such as a semiconductor laser, etc., is collected by a collimating lens 5 and turns into parallel light. After conversion from linearly-polarized light (P-waves) into circularly-polarized light by a quarter wave plate 6, the parallel light is collected by an objective lens 7 and focused on the signal plane 8a of an optical disc 8 (to form an light spot). Guide grooves 8g, which extend in the direction of rotation of the optical disc 8 (hereinafter referred to as the "optical disc rotation direction"), are formed at constant pitch in the radial direction of the optical disc 8 (hereinafter referred to as the "optical disc radial direction") on the signal plane 8a of the optical disc 8. Light reflected by the signal plane 8a of the optical disc 8 passes through the objective lens 7 and is converted into linearly-polarized light (S-waves) by the quarter wave plate 6, whereupon it passes through the collimating lens 5 and turns into converging light. After reflection from the split plane 4a of the polarizing beam splitter 4, the converging light passes through a cylindrical lens 9 arranged such that the central axis of the cylindrical surface is inclined at an angle of 45 degrees relative to a plane parallel to the surface of the paper and is incident upon a light detection surface 10a on a light detection substrate 10 located in the vicinity of the circle of least confusion (at the middle of the vertical focal line and horizontal focal line).

There is a rectilinear grating 3b and a rectilinear grating 3c formed on the surface (grating surface 3a) of the transparent substrate 3, with the axis 3Y, which corresponds to the optical disc rotation direction, serving as a boundary therebetween. The shape of the light spot formed on the grating surface 3a by light emitted from the radiation light source 1 and transmitted through the transparent substrate 3 (transmitted light) is a circle 2a, whose center is at the center 30 of the grating surface 3a. The orientation of the respective gratings is perpendicular to the axis 3Y, with the grating phases of the rectilinear grating 3b and rectilinear grating 3c shifted by π relative to each other. Light transmitted through the transparent substrate 3 (transmitted light) is diffracted by the rectilinear grating 3b and rectilinear grating 3c, with ±1st order diffracted light beams generated in addition to zero order diffracted light (light that is transmitted without change) (the grating-diffracted light is hereinafter referred to as "Gr-diffracted light"). Since the wavefront of the zero order Gr-diffracted light is not affected by the grating, no phase change takes place, but the wavefronts of the ±1st order Gr-diffracted light beams are phase-shifted by π between the left and right of the axis 3Y serving as a boundary. These Gr-diffracted light beams form light spots on the signal plane 8a of the optical disc 8. In addition, during tracking control, a light spot 2b, which corresponds to the zero order Gr-diffracted light, is positioned directly on a guide groove 8g. Each of light spots 2b', 2b", which correspond to the ±1st order Gr-diffracted light beams, becomes two light spots separated in the optical disc radial direction about the guide groove 8g. This phenomenon of the two light spots 2b', 2b" being doubled respectively is due to the fact that the wavefronts of the ±1st order Gr-diffracted light beams are phase-shifted by π between the left and right of the central axis 3Y serving as a boundary. It should be noted that the diffraction efficiencies of the rectilinear grating 3b and rectilinear grating 3c are set such that the quantities of light of the light spots 2b', 2b" are respectively approximately 1/10 of the quantity of light of the light spot 2b.

FIG. 9(a) is a diagram illustrating the configuration of a light detection surface used in a conventional optical disc device and the distribution of light on the light detection surface. FIG. 9(b) is a diagram illustrating light fluxes prior to incidence upon the cylindrical lens used in the optical disc device. The light fluxes 2c, 2c', and 2c" prior to incidence upon the cylindrical lens 9 respectively correspond to the light spots 2b, 2b', and 2b" on the signal plane 8a of the optical disc 8. Diffracted light beams 2cp and 2cm, diffracted by the guide grooves 8g of the optical disc 8, are superimposed upon the zero order Gr-diffracted light 2c while being shifted along the axis 9X, which corresponds to the optical disc radial direction (the guide groove-diffracted light is hereinafter referred to as the "groove-diffracted light"). The zero order groove-diffracted light beams of the ±1st order Gr-diffracted light beams 2c' and 2c" are phase-shifted by π between the left and right of the axis 9Y serving as a boundary, which is parallel to the optical disc rotation direction, with the ±1st order groove-diffracted light beams superimposed upon the zero order groove-diffracted light beams while being π-shifted along the axis 9X. Light spots 2d, 2d', and 2d" on the light detection surface 10a respectively correspond to the light fluxes 2c, 2c' and 2c" prior to incidence upon the cylindrical lens 9. Since the distribution of the light fluxes 2c, 2c' and 2c" is inverted with respect to the central axis of the cylindrical surface of the cylindrical lens 9 as a result of passage through the cylindrical lens 9, the distribution of the light spots 2d, 2d', and 2d" on the light detection surface 10a is rotated as a whole through 90 degrees relative to the light fluxes 2c, 2c', and 2c" (not only the distribution of light, but also the direction of travel of the light spots during a lens shift of the objective lens 7 (hereinafter, a lens shift of the objective lens also is referred to simply as a "lens shift") is rotated through 90 degrees as well). Light detectors 11, 11' and 11" are arranged on the light detection surface 10a so as to be substantially coaxial with the light spots 2d, 2d', and 2d". Each light detector 11, 11' and 11" is divided into four detection cells (detection cells 11a, 11b, 11c, 11d; detection cells 11a', 11b', 11c', 11d'; and detection cells 11a", 11b", 11c", 11d", respectively) by straight lines parallel to the axes 9X and 9Y (the straight line parallel to the axis 9Y is designated as 10X), with the points of intersection of the parting lines substantially coinciding with the centers of the light spots 2d, 2d', and 2d".

In FIG. 9, the following twelve signals (detection signals) are obtained by the detection cells.

T1=signal obtained in detection cell 11a.
T2=signal obtained in detection cell 11b.

T3=signal obtained in detection cell 11c.
T4=signal obtained in detection cell 11d.
T1'=signal obtained in detection cell 11a'.
T2'=signal obtained in detection cell 11b'.
T3'=signal obtained in detection cell 11c'.
T4'=signal obtained in detection cell 11d'.
T1"=signal obtained in detection cell 11a".
T2"=signal obtained in detection cell 11b".
T3"=signal obtained in detection cell 11c".
T4"=signal obtained in detection cell 11d".
Based on the following formulae (1)-(3), these detection signals are used to generate a tracking error signal TE associated with the tracks of the optical disc, a focus error signal FE associated with the signal plane of the optical disc, and a reproduction signal RF of the signal plane of the optical disc.

$$TE = T1 + T2 - T3 - T4 - \\ k \times (T1' + T2' - T3' - T4' + T1'' + T2'' - T3'' - T4'')$$ Formula (1)

$$FE = T1 + T3 - T2 - T4$$ Formula (2)

$$RF = T1 + T2 + T3 + T4$$ Formula (3)

Here, the magnitude of the coefficient k is set so as to cancel lens shift-induced tracking error signal offsets generated during tracking control. For instance, when the quantity of light of the light spots $2d'$ and $2d''$ is approximately 1/10 of the quantity of light of the light spot $2d$, the magnitude of the coefficient k is about 5.

FIG. 10, which is a diagram of a conventional optical disc device, is used to explain the lens shift-induced tracking error signal offset. Hereinafter the explanation will be based on a state before the 90-degree rotation by the cylindrical lens.

As shown in FIG. 10, when the objective lens 7 is shifted by ε from the optical axis L in the optical disc radial direction (in the direction of the axis 10X), Gauss-distributed light 2A, which is incident upon the objective lens 7 in a rotationally symmetric manner parallel to the optical axis L, is reflected from the signal plane 8a of the optical disc 8, thereby producing light 2B, whose distribution is shifted by 2ε (shifted only by ε relative to the central axis 7c of the objective lens 7). Accordingly, the distribution of the light spot 2d on the light detector 11 is centered on location 2D, which is shifted by an amount proportionate to 2ε (strictly speaking, by a value that is a product of 2ε and (half of astigmatic difference of cylindrical lens 9)/(focal length of collimating lens 5)), and the outside of the circle 7a (shifted by an amount proportionate to ε), which is a pattern produced by projecting the aperture of the objective lens 7 onto the light detection surface 10a along the light beam, is shielded from light. As a result, the quantity of light detected in the detection cells 11c, 11d exceeds the quantity of light detected in the detection cells 11a, 11b and an offset is generated in the tracking error signal obtained in the light detector 11 alone (TE=T1+T2-T3-T4). Offset generation in the light detectors 11', 11" is also completely identical to the offset generation in the light detector 11, such that, when normalized by the detected quantity of light, the same amount of offset with the same polarity is obtained for the tracking error signal obtained in the light detector 11' alone (TE=T1'+T2'-T3'-T4') and for the tracking error signal obtained in the light detector 11" alone (TE=T1"+T2"-T3"-T4"). On the other hand, as concerns tracking error signals generated under off-track conditions in the light spots on the signal plane 8a of the optical disc 8, the tracking error signals obtained in the light detector 11 alone and the tracking error signal obtained in the light detectors 11', 11" alone have mutually opposed polarities. This is due to the fact that the interference relationship between the groove-diffracted light beams is inverted because the phases of the groove-diffracted light beams of the light spots on the light detectors 11', 11" are shifted by π between the left and right of the axis serving as a boundary, which is parallel to the optical disc rotation direction. Accordingly, unlike the tracking error signal (T1+T2-T3-T4) obtained in the light detector 11 alone, the tracking error signal obtained in accordance with the formula (1) makes it possible to cancel the influence of lens shift-induced off-track without affecting the sensitivity of detection (and even increase the detection output).

Patent document 1 JP H9-81942 A

DISCLOSURE OF INVENTION

Problem to be Solved by the Invention

The above-described conventional optical disk device has the following problem. Namely, in FIG. 8, when the positions of the light spots 2b', 2b" are shifted and the respective two light spot centers of the light spots 2b', 2b" are located in the vicinity of the central portion 81 of the guide groove 8g, the polarities of the tracking error signals obtained in the light detectors 11', 11" match the polarity of the tracking error signal obtained in the light detector 11. In addition, even when the positions of the light spots 2b', 2b" change, the way the lens shift-related tracking error offset is generated does not change, as a result of which setting the coefficient k so as to cancel the influence of lens shift-induced off-track decreases the detected output of the tracking error signal obtained based on the formula (1), with the detected output sometimes reduced to zero. Accordingly, in the above-described conventional optical disc device, the rotation of the transparent substrate 3, which has rectilinear gratings 3b, 3c formed thereon, has to be regulated accurately in order to make the respective two light spots of the light spots 2b', 2b" centrally symmetrical about the guide groove 8g, which renders the assembly of the optical disc device more difficult.

The present invention has been made to solve the above-described problems in the prior art. It is an object of the present invention to provide an optical disc device capable of canceling the influence of lens shift-induced off-track without impairing the detected tracking error signal output even without rotational adjustment of the rectilinear gratings.

Means for Solving Problem

In order to achieve the above object, the configuration of the optical disc device according to the present invention comprises a radiation light source, a diffraction grating formed on a diffraction grating surface, an objective lens, light diverging means, and light detectors. In said device, light emitted from the radiation light source passes through the diffraction grating and is separated into transmitted light a, +1st order diffracted light b, and −1st order diffracted light c; the transmitted light a, the +1st order diffracted light b, and the −1st order diffracted light c are collected through the objective lens on the tracks of the signal plane of the optical disc in a partially overlapped state; light reflected by the tracks of the signal plane passes through the objective lens and is incident upon the light diverging means; and, as far as the light incident upon the light diverging means is concerned, depending on the location of incidence, light corresponding to the transmitted light "a" diverges into two light beams a1 and a2, which are respectively incident upon light detection regions A1, A2 on the light detectors; light corresponding to the +1st order diffracted light "b" diverges into two light beams b1 and b2, which are respectively incident upon light detection regions B1, B2 on the light detectors; light corresponding to the −1st order diffracted light "c" diverges into two light beams c1 and c2, which are respectively incident upon light detection regions C1, C2 on the light detectors; and a tracking error signal associated with the tracks of the optical disc is generated by combining signals detected in the light detection regions A1, A2, B1, B2, C1, and C2.

In the configuration of the optical disc device of the present invention, the objective lens and light diverging means preferably are secured together into an integral whole.

Moreover, in the configuration of the optical disc device of the present invention, the light detection region B2 is placed in electrical communication area with the light detection region A1 in a state wherein it is multiplied by a constant k and the light detection region C1 is placed in electrical communication area with the light detection region A2 in a state wherein it is multiplied by a constant k.

Moreover, in the configuration of the optical disc device of the present invention, the light detection region A1 and light detection region C2 are placed either in electrical communication or are the same light detection region; in addition, the light detection region A2 and light detection region B1 are placed either in electrical communication or are the same light detection region. Moreover, in such a case, the tracking error signal associated with the tracks of the optical disc preferably is calculated as $\Delta T1-k\times\Delta T4$, where $\Delta T1$ is the difference between the signals detected in the light detection regions A1 and A2, $\Delta T4$ is the difference between the signals detected in the light detection regions B2 and C1, and k is a coefficient.

Moreover, in the configuration of the optical disc device of the present invention, the projection region on the light diverging means corresponding to the +1st order diffracted light b preferably has a width that does not exceed the radius of the objective lens and is parallel to a straight line passing through the center of the objective lens and corresponding to the optical disc rotation direction. Moreover, in such a case, when the aperture of the objective lens is projected onto the diffraction grating surface along a forward-propagating light beam, the diffraction grating regions on the diffraction grating surface preferably have a width that does not exceed the radius of the projected outline of the aperture and are aligned with a straight line passing through the center of the projected outline of the aperture and corresponding to the optical disc rotation direction. Additionally, in such a case, it is preferable for the diffraction gratings to be rectilinear gratings aligned with the optical disc radial direction. Moreover, in such a case, the diffraction grating region preferably is located on the outside of the projected outline of the aperture. Furthermore, in such a case, the diffraction grating preferably is subdivided into multiple strip-shaped regions along straight lines corresponding to the optical disc rotation direction, such that the ridges and valleys of the diffraction gratings in every other strip-shaped region are coordinated and the ridges and valleys of the diffraction gratings in the adjacent strip-shaped regions are shifted by ⅕-½ pitch.

Moreover, in the configuration of the optical disc device of the present invention, the light diverging means preferably is split into two regions by a straight line passing through the center of the objective lens and parallel to the optical disc rotation direction, with divergence in the respective regions producing the light beams a1, a2, b1 and b2, c1 and c2.

Moreover, in the configuration of the optical disc device of the present invention, the tracking error signal associated with the tracks of the optical disc preferably is calculated as $\Delta T1-k\times(\Delta T2+\Delta T3)$, where $\Delta T1$ is the difference between the signals detected in the light detection regions A1 and A2, $\Delta T2$ is the difference between the signals detected in the light detection regions B1 and B2, and $\Delta T3$ is the difference between the signals detected in the light detection regions C1 and C2, and k is a coefficient.

EFFECTS OF THE INVENTION

The present invention can provide an optical disc device capable of canceling the influence of lens shift-induced off-track without impairing the detected tracking error signal output even without rotational adjustment of the rectilinear gratings.

BEST MODE FOR CARRYING OUT THE INVENTION

Figure 1:
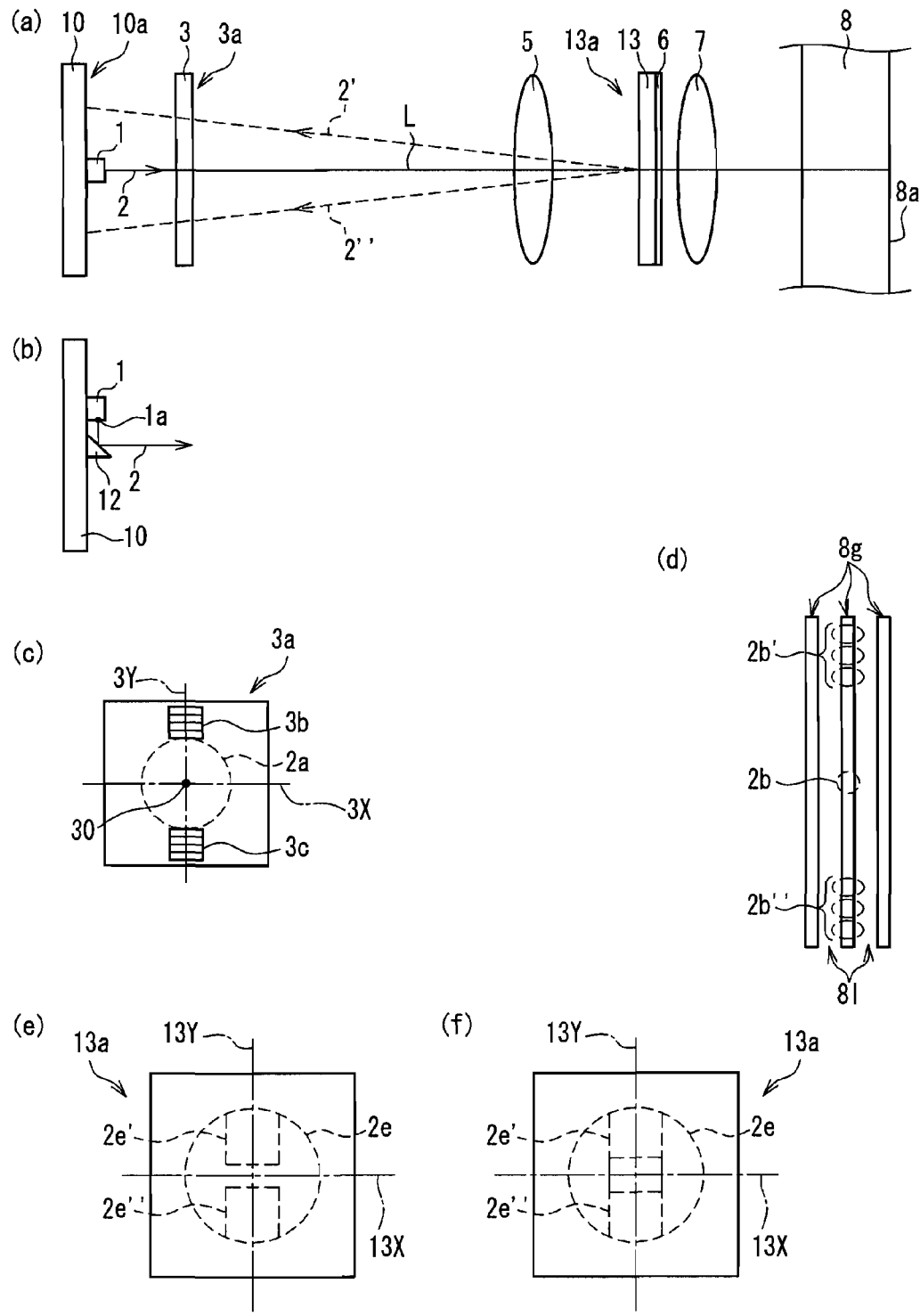
FIG. 1(a) is a side view illustrating an optical disc device used in an embodiment of the present invention.
FIG. 1(b) is a plan view illustrating the light source portion of the optical disc device.
FIG. 1(c) is a diagram illustrating a grating pattern formed on a grating surface used in the optical disc device and the distribution of light on the grating surface.
FIG. 1(d) is a diagram illustrating the configuration of the signal plane of the optical disc and the distribution of light on the signal plane.
FIG. 1(e) is a diagram illustrating the distribution of light on a holographic surface used in the optical disc device in case of a grating pattern with a large pitch.
FIG. 1(f) is a diagram illustrating the distribution of light on the holographic surface used in the optical disc device in case of a grating pattern with a small pitch.

Below, the present invention is explained more specifically with reference to embodiments. It should be noted that components common with the conventional optical disc device are explained by assigning the same reference numerals.

Embodiment 1

FIG. 1(a) is a side view illustrating an optical disc device used in an embodiment of the present invention; FIG. 1(b) is a plan view illustrating the light source portion of the optical disc device; FIG. 1(c) is a diagram illustrating a grating pattern formed on the grating surface used in the optical disc device and the distribution of light on the grating surface; FIG. 1(d) is a diagram illustrating the configuration of the signal plane of the optical disc and the distribution of light on the signal plane; FIG. 1(e) is a diagram illustrating the distribution of light on a holographic surface used in the optical disc device in case of a grating pattern with a large pitch, and FIG. 1(f) is a diagram illustrating the distribution of light on a holographic surface used in the optical disc device in case of a grating pattern with a small pitch.

As shown in FIG. 1(a), the optical disc device of the present embodiment comprises a radiation light source 1 comprising a semiconductor laser etc., a diffraction grating diffracting light emitted from the radiation light source 1, a collimating lens 5 converting light diffracted by the diffraction grating into parallel light, a quarter wave plate 6 converting linearly-polarized light into circularly-polarized light and circularly-polarized light into linearly-polarized light, an objective lens 7 collecting the parallel light on the tracks of the signal plane 8a of the optical disc 8, a hologram diffracting light (returned light) reflected by the signal plane 8a of the optical disc 8, and a light detector, on which the returned light diffracted by the hologram is collected.

As shown in FIGS. 1(a) and 1(b), the light detector comprises a light detection substrate 10 and a light detection surface 10a formed on the light detection substrate 10. The light detection surface 10a is positioned substantially at the location of the focal plane of the collimating lens 5 (i.e. the location of the virtual emission point 1a of the radiation light source 1 illustrated in FIG. 1(b)). The radiation light source 1 is attached to the light detection substrate 10. Moreover, a reflective mirror 12, which reflects laser light emitted from the radiation light source 1 and bends its path, is attached to the light detection substrate 10 in the vicinity of the radiation light source 1.

As shown in FIGS. 1(a) and 1(c), the diffraction grating comprises a transparent substrate 3 and rectilinear gratings 3b, 3c formed on the surface (grating surface 3a) of the transparent substrate 3. Here, the rectilinear grating 3b and rectilinear grating 3c are formed to be spaced apart along the axis 3Y passing through the center 30 of the grating surface 3a. More specifically, if the outline produced by projecting the aperture of the objective lens 7 onto the grating surface 3a along an incident light beam (forward-propagating light beam) is designated as circle 2a, the rectilinear grating regions 3b, 3c are located on the outside of the circle 2a. The respective gratings have the same pitch, with their orientation being perpendicular to the axis 3Y (i.e. they are parallel to the axis 3X, which is perpendicular to the axis 3Y). Moreover, the rectilinear gratings 3b, 3c are divided respectively into two regions located 20 μm (or 20 μm-40 μm) apart along the axis 3Y, with the phase of the grating in the two regions shifted by ¼ pitch (i.e. π/2) (the phase shift preferably is about ⅕-½ pitch). The width of the rectilinear grating 3b and rectilinear grating 3c in the direction of the axis 3X is approximately ⅓ of the diameter of the circle 2a (but does not exceed ½ of the diameter of the circle 2a). Moreover, the cross-section of the rectilinear grating 3b and rectilinear grating 3c in the direction of the axis 3Y has a zigzagged (serrated) shape or a stepped shape inscribed in a serrated shape, with their diffraction ratios set such that the quantity of light in the light spots 2b' and 2b" is approximately 1/10 of the quantity of light in the light spot 2b (in the present embodiment, the grating regions are limited, unlike in the conventional technology, as a result of which the quantity of the diffracted light is smaller and a zigzagged cross-section, which has a higher diffraction ratio, is employed in order to compensate).

As shown in FIGS. 1(a), 1(e) and 1(f), the hologram comprises a polarizing holographic substrate 13 and a holographic surface 13a, which is formed on the polarizing holographic substrate 13 and serves as a light diverging means. A quarter wave plate 6 is provided on the polarizing holographic substrate 13, on which the holographic surface 13a is formed (the quarter wave plate 6 is adhered to the polarizing holographic substrate 13). All of the above is secured inside the same housing as the objective lens 7 and adapted to move integrally with the objective lens 7.

As shown in FIG. 1, laser light 2 emitted from the emission point 1a of the radiation light source 1 is reflected by the reflective mirror 12 and passes through the transparent substrate 3, after which it is collected by the collimating lens 5 and turns into parallel light. After passing through the polarizing holographic substrate 13 and conversion from linearly-polarized light (S-waves or P-waves) into circularly-polarized light by the quarter wave plate 6, the parallel light is collected by the objective lens 7 and focused on the signal plane 8a of the optical disc 8 (to form an light spot). The shape of the light spot formed on the grating surface 3a by the light emitted from the radiation light source 1 and transmitted through the transparent substrate 3 (transmitted light) is a circle, 2a, whose center is the center 30 of the grating surface 3a. The distribution of laser light 2 transmitted through the transparent substrate 3 on the grating surface 3a extends outside the circle 2a, with the extended portion passing through the rectilinear grating 3b and rectilinear grating 3c and undergoing diffraction, producing ±1st diffracted light beams (the grating-diffracted light is hereinafter referred to as "Gr-diffracted light"). Then, the components of the diffracted light incident within the aperture of the objective lens 7 are the components diffracted in the vicinity of the optical axis (−1st order Gr-diffracted light in case of the rectilinear grating 3b and +1st order Gr-diffracted light in case of rectilinear grating 3c). Combined with the components transmitted through the circle 2a (they are not diffracted, but for convenience, they are termed "zero order Gr-diffracted light"), these components form light spots on the signal plane 8a of the optical disc 8.

Light reflected by the signal plane 8a of the optical disc 8 passes through the objective lens 7 and is converted into linearly-polarized light (P-waves or S-waves) by the quarter wave plate 6, after which it is incident upon the holographic surface 13a. The linearly-polarized light incident upon the holographic surface 13a is diffracted by the holographic surface 13a and split into +1st order diffracted light 2' and −1st order diffracted light 2" located symmetrically with respect to the optical axis L (hologram-diffracted light is hereinafter referred to as "holographically diffracted light"). These holographically diffracted light beams pass through the collimating lens 5 and turn into converging light, which is incident upon the light detection surface 10a on the light detection substrate 10.

During tracking control, the light spot 2b, which corresponds to the zero order Gr-diffracted light, is positioned directly on the guide groove 8g. However, the light spots 2b', 2b", which correspond to the ±1st order Gr-diffracted light, (respectively corresponding to the +1st order Gr-diffracted light of the rectilinear grating 3c and −1st order Gr-diffracted light of the rectilinear grating 3b) do not have to be positioned directly on the guide groove 8g. It should be noted that the wavefronts of the ±1st order Gr-diffracted light beams are divided into two regions located 20 μm apart along the axis 3Y, with the phases in the two regions being shifted by π/2, as a result of which the focused light beams form three light spots separated along the guide groove 8g (in the optical disc rotation direction) (or two light spots when the phases in the two regions are shifted by π). Light that is reflected by the signal plane 8a of the optical disc 8, passes through the objective lens 7 and is incident upon the holographic surface 13a, is produced by the superimposition of the ±1st order Gr-diffracted light beams 2e', 2e" on the zero order Gr-diffracted light 2e (the Gr-diffracted light beams 2e, 2e', and 2e" correspond, respectively, to the light spots 2b, 2b', and 2b"), with the width of the ±1st order Gr-diffracted light beams 2e', 2e" in the optical disc radial direction (direction of the axis 13X) being approximately ⅓ of the radius (the aperture radius of the objective lens 7) of the zero order Gr-diffracted light 2e. If the pitch of the rectilinear gratings 3b, 3c is large, the ±1st order Gr-diffracted light beams 2e', 2e" are separated and do not overlap (see FIG. 1(e)), and if the pitch of the rectilinear gratings 3b, 3c is small, the ±1st order Gr-diffracted light beams 2e', 2e" are distributed such that they cross the axis 13X and become overlapped (see FIG. 1(f)).

FIG. 2(a) is a diagram illustrating a light detection pattern formed on the light detector used in the optical disc device in the first embodiment of the present invention and the optical distribution of returned light on the light detector produced by laser light emitted from the radiation light source, and FIG. 2(b) is a diagram illustrating a hologram configuration used in the optical disc device. FIGS. 2(a) and 2(b) illustrate the light detection surface and holographic surface as viewed from the direction of the optical disc. It should be noted that the ±1 order Gr-diffracted light beams 2e', 2e" on the holographic surface 13a are in the state illustrated in FIG. 1(e).

As shown in FIG. 2(b), two straight lines (13X, 13Y), which intersect at right angles at the intersection point 130 between the holographic surface 13a and optical axis L, divide the holographic surface 13a into four quadrants 131, 132, 133, and 134. The axis 13X is parallel to the optical disc radial direction, with diffracted light beams 2ep and 2em, which are produced by the guide grooves 8g formed on the signal plane 8a of the optical disc 8, being superimposed upon returned light (zero order Gr-diffracted light 2e) on the holographic surface 13a while being shifted along the axis 13X, which corresponds to the optical disc radial direction (guide groove-diffracted light is hereinafter referred to as "groove-diffracted light"). The example illustrated in FIG. 2(b) shows light returned from an optical disc with a narrow-pitch format, such as a DVD-R or DVD-RW, etc., with the outline of the groove-diffracted light shown as a dashed line. When this light passes through the holographic surface 13a, ±1st order diffracted light beams are generated, which are divided among the quadrants 131, 132, 133, and 134 and are incident upon the light detection surface 10a on the light detection substrate 10.

On the other hand, as shown in FIG. 2(a), on the light detection surface 10a, two straight lines intersecting at the intersection point 100 between the optical axis L and light detection surface 10a and parallel to the axis 13X and axis 13Y are used as axis 10X and axis 10Y. Comb-shaped focus detection cells 95, 96 aligned with the axis 10X are arranged in an alternating fashion on the minus side of the axis 10X (detection cells assigned the same reference numerals are in electrical communication) and square-shaped tracking detection cells 91, 92, 92', 93, 94, and 94' are arranged on the plus side of the axis 10X (light detection pattern). These tracking detection cells 91, 92, 92', 93, 94, and 94' form a shape that is symmetrical when rotated 180 degrees about the center of the boundary line of the tracking detection cells 92 and 94. The tracking detection cells 92, 92', 94, and 94' are arranged in a row in the direction of the axis 10Y while tracking detection cells 91 and 93 are displaced from the row aligned with the axis 10Y in mutually opposed directions along the axis 10X. It should be noted that the laser light 2 emitted from the emission point 1a of the radiation light source 1 travels parallel to the axis 10Y in a plane parallel to the paper surface and is reflected by the reflective mirror 12 in the direction of the optical axis L (the direction that goes through point 100 at right angles to the surface of the paper).

In the zero order Gr-diffracted light 2e on the holographic surface 13a, +1st order holographically diffracted light diffracted by the quadrant 131 of the holographic surface 13a is collected into light spot 2d1 located inside the tracking detection cell 91, −1st order holographically diffracted light is collected onto light spot 2D1 straddling a boundary between focus detection cells 95 and 96, +1st order holographically diffracted light diffracted by the quadrant 132 of the holographic surface 13a is collected into light spot 2d2 located inside the tracking detection cell 92, −1st order holographically diffracted light is collected onto light spot 2D2 straddling a boundary between focus detection cells 95 and 96, +1st order holographically diffracted light diffracted by the quadrant 133 of the holographic surface 13a is collected into light spot 2d3 located inside the tracking detection cell 93, −1st order holographically diffracted light is collected onto light spot 2D3 straddling a boundary between focus detection cells 95 and 96, +1st order holographically diffracted light diffracted by the quadrant 134 of the holographic surface 13a is collected into light spot 2d4 located inside the tracking detection cell 94, and −1st order holographically diffracted light is collected onto light spot 2D4 straddling a boundary between focus detection cells 95 and 96.

Moreover, in the +1st order Gr-diffracted light 2e' on the holographic surface 13a, holographically diffracted light diffracted by the quadrant 131 of the holographic surface 13a is collected into light spot 2d1' located outside of the detection cells, and holographically diffracted light diffracted by the quadrant 132 of the holographic surface 13a is collected into light spot 2d2' located inside the tracking detection cell 92'. In addition, in the −1st order Gr-diffracted light 2e" on the holographic surface 13a, holographically diffracted light diffracted by the quadrant 133 of the holographic surface 13a is collected into light spot 2d3" located outside of the detection cells, and holographically diffracted light diffracted by the quadrant 134 of the holographic surface 13a is collected into light spot 2d4" located inside the tracking detection cell 94".

As far as the zero order Gr-diffracted light 2e is concerned, the light spots 2D1, 2D2, 2D3, and 2D4, which are produced by focusing −1st holographically diffracted light diffracted, respectively, by the quadrants 131, 132, 133, and 134 of the holographic surface 13a, are substantially point-symmetric about point 100 with respect to the light spots 2d1, 2d2, 2d3, and 2d4, which are produced by focusing the +1st order holographically diffracted light.

In contrast, as far as the holographically diffracted light beams of the ±1st order Gr-diffracted light beams 2e', 2e" are concerned, the holographically diffracted light of the +1st order Gr-diffracted light 2e' is collected at a location shifted towards the plus side of the axis 10Y while the holographically diffracted light of the −1st order Gr-diffracted light 2e" is collected at a location shifted towards the minus side of the axis 10Y in relation to the focusing location of the holographically diffracted light of the zero order Gr-diffracted light 2e.

It should be noted that while the focal lines of the light spots 2D1, 2D2, 2D3, and 2D4 oriented in the direction of axis 10X may be located on either side of the light detection surface 10a (on the rear side (side located farther away from the holographic surface 13a) or on front side (side located closer to the holographic surface 13a)), the focal lines of the light spots 2D1, 2D3 oriented in the direction of axis 10Y are located on the rear side (or front side) of the light detection surface 10a and the focal lines of the light spots 2D2, 2D4 oriented in the direction of axis 10Y are located on the front side (or rear side) of the light detection surface 10a. Moreover, a configuration also is contemplated where each of the quadrants 131, 132, 133, and 134 of the holographic surface 13a is split into strip-shaped regions aligned with the axis 13Y, with the holographically diffracted light that is diffracted by every other strip-shaped region being collected on the rear side of the light detection surface 10a and the holographically diffracted light that is diffracted by the remaining strip-shaped regions being collected on the front side of the light detection surface 10a.

Figure 2:
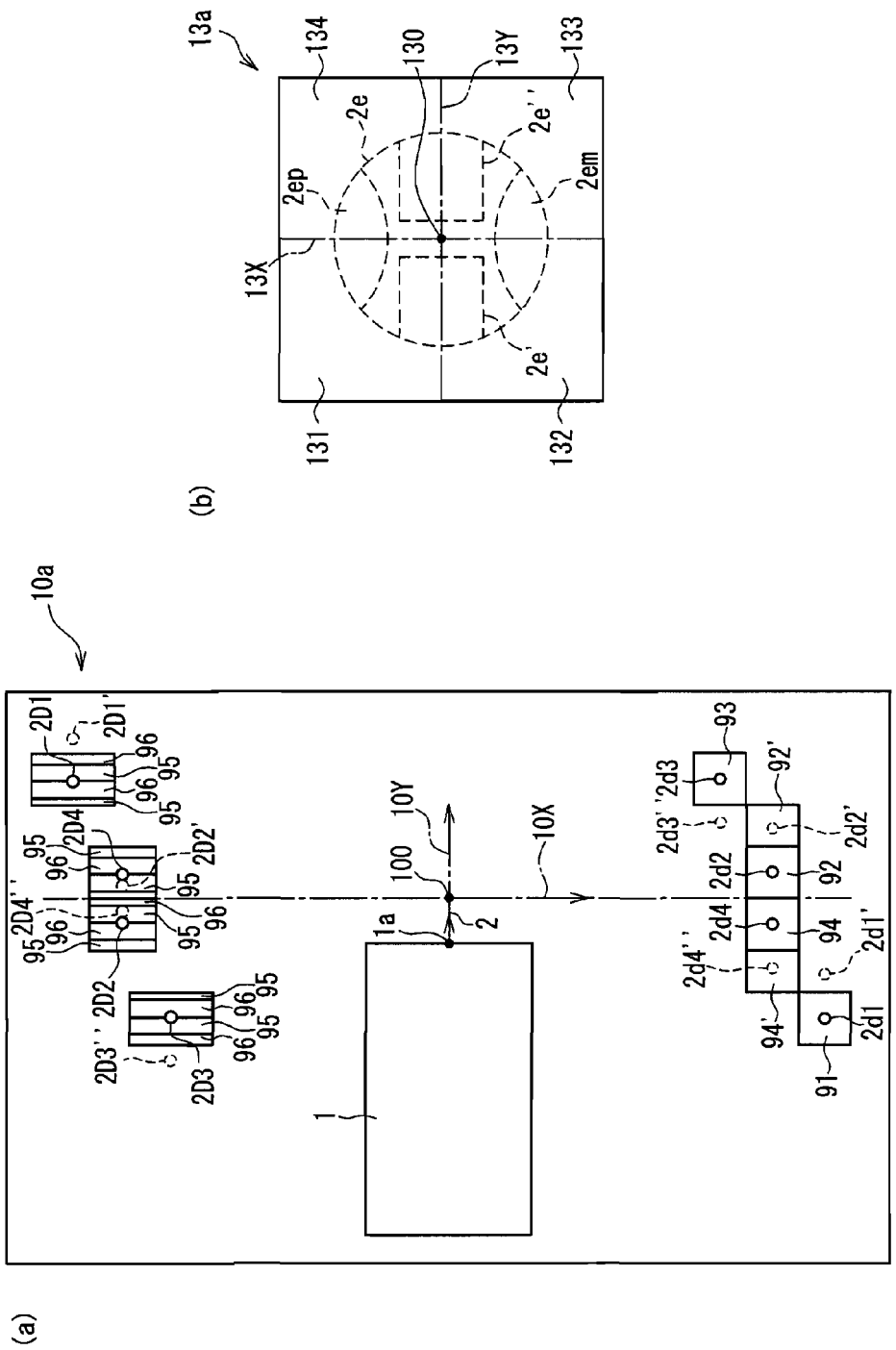
FIG. 2(a) is a diagram illustrating a light detection pattern formed on a light detector used in an optical disc device in a first embodiment of the present invention and optical distribution of returned light on the light detector produced by laser light emitted from a radiation light source.
FIG. 2(b) is a diagram illustrating a hologram configuration used in the optical disc device.

In FIG. 2, the following eight signals (detection signals) are obtained by the detection cells.

T1=signal obtained in the detection cell 91.
T2=signal obtained in the detection cell 92.
T3=signal obtained in the detection cell 93.
T4=signal obtained in the detection cell 94.
T2'=signal obtained in the detection cell 92'.
T4'=signal obtained in the detection cell 94'.
F1=signal obtained in the detection cell 95.
F2=signal obtained in the detection cell 96.

Based on the following expressions (4)-(7), these detection signals are used to calculate a tracking error signal TE1 associated with the tracks of a recordable optical disc, a tracking error signal TE2 associated with the tracks of a read-only optical disc such as a DVD-ROM, etc., a focus error signal FE associated with the signal plane of an optical disc, and a reproduction signal RF of the signal plane of an optical disc.

$$TE1 = T4 - T2 - k \times (T4' - T2') \quad \text{Eq. (4)}$$

$$TE2 = T1 + T3 - T2 - T4 \quad \text{Eq. (5)}$$

$$FE = F1 - F2 \quad \text{Eq. (6)}$$

$$RF = T1 + T2 + T3 + T4 \quad \text{Eq. (7)}$$

Here, the magnitude of the coefficient k is set to cancel the influence of off-track produced by the shifting of the objective lens 7 in the process of tracking control (the shifting of the objective lens is hereinafter referred to simply as "lens shift").

Figure 3:
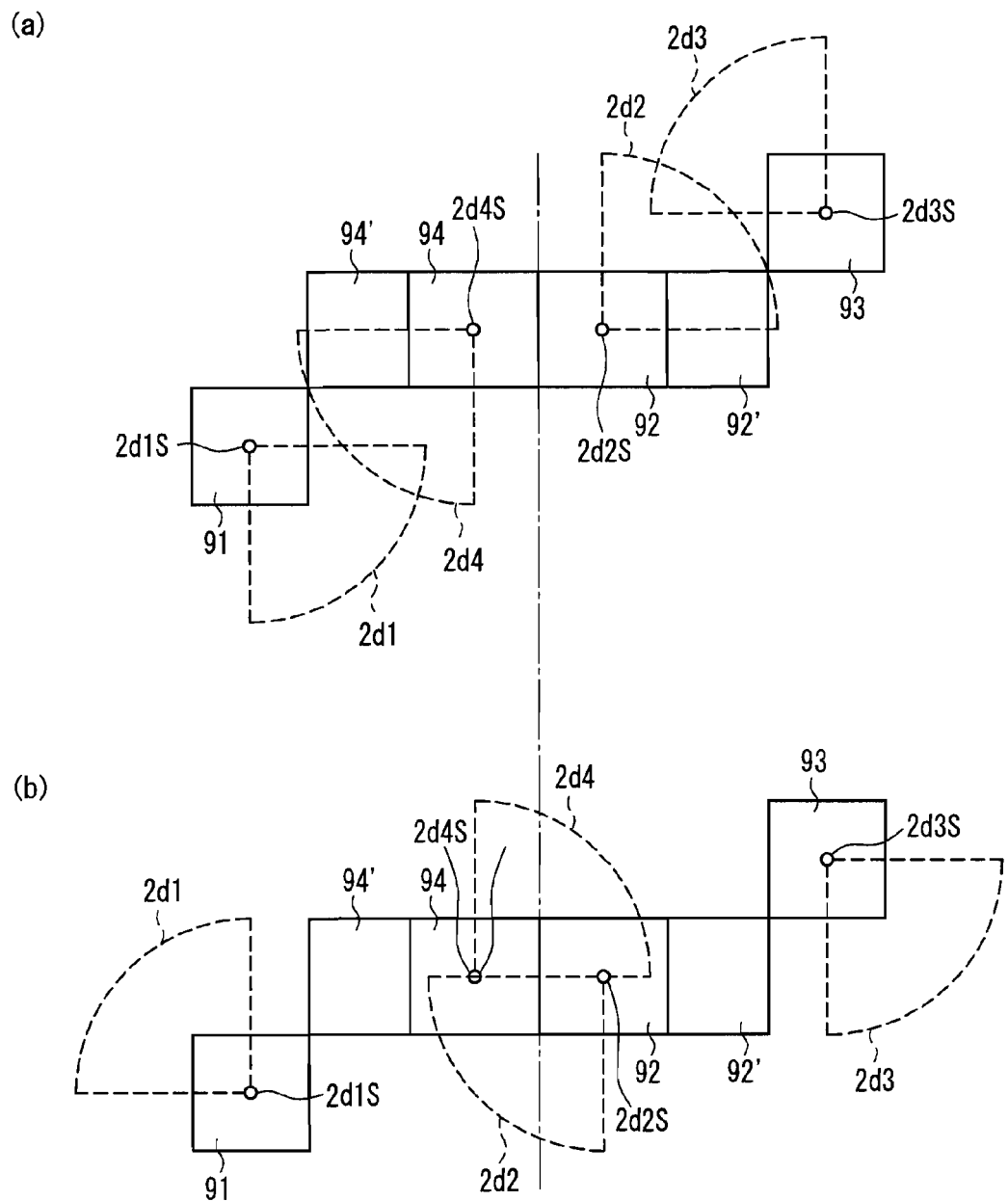
FIG. 3 is a diagram illustrating the distribution of light on the light detection surface obtained when focused light is defocused with respect to the signal plane of the optical disc in the first embodiment of the present invention, where (a) illustrates a case in which the signal plane of the optical disc is located farther away from the object lens, and (b) a case in which the signal plane of the optical disc is located closer to the object lens.

FIG. 3 is a diagram illustrating the distribution of light on the light detection side obtained when focused light is defocused with respect to the signal plane of the optical disc in the first embodiment of the present invention, where (a) illustrates a case in which the signal plane of the optical disc is located farther away from the object lens, and (b) a case in which the signal plane of the optical disc is located closer to the object lens. It should be noted that although FIG. 3 shows light spots only on the side of the +1st order holographically diffracted light, light spots on the side of the −1st order holographically diffracted light are located point-symmetrically about point 100 with respect to the light spots on the side of the +1st order holographically diffracted light. In FIGS. 3(a) and 3(b), optical distributions 2d1, 2d3 do not overlap with the detection cells 92, 92', 94, and 94'. This is due to the fact that the reference points 2d1S and 2d3S of the optical distributions 2d1 and 2d3 are located in the detection cells 91 and 93, which are shifted relative to the rest of the detection cells in mutually opposed directions along the axis 10X.

In the case of the so-called dual-layer discs (optical discs commercialized as DVD-Rs, Blu-Ray discs etc., which have a two-layer structure with two signal planes sandwiching an adhesive layer having a thickness of several tens of μm (with a thickness of "d" and a refractive index of "n")), light reflected by the other signal plane in the process of focusing on one of the signal planes returns to the light detection surface in a state where it is defocused by 2d/n after a round trip, with the respective amount of defocusing during each leg of the trip being d/n. Then, depending on the configuration of the light detector, light reflected by the other signal plane gets mixed with it as stray light, greatly affecting the tracking error signal and focus error signal. However, since only the detection cells 92, 92', 94, and 94' are used for tracking error detection in accordance with the above-mentioned formula (4) in the present embodiment, half of the light spots (2d1, 2d3) do not produce stray light during tracking error detection and the remaining light spots (2d2, 2d4) overlie tracking detection cells while remaining in a symmetrical relationship, as a result of which external perturbations of the tracking error signal TE1 are cancelled. As a result, tracking control in a dual layer disc is stabilized, thereby permitting elimination of off-track and track jumps during tracking control.

Figure 4:
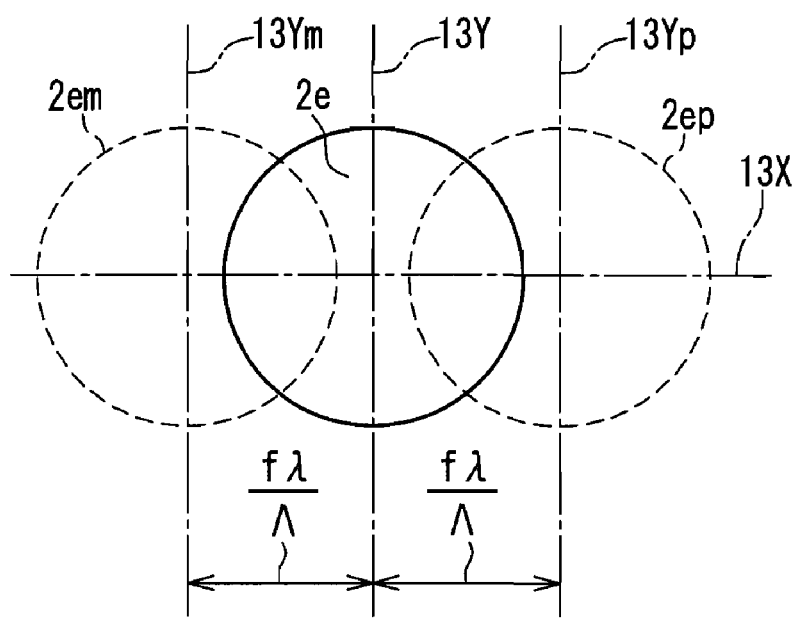
FIG. 4 is a diagram illustrating the optical distribution of light returned from an optical disc on the holographic surface in the optical disc device used in the first embodiment of the present invention, where (a) illustrates zero-order Gr-diffracted light, and (b) illustrates ±1st order Gr-diffracted light.
Figure 4:
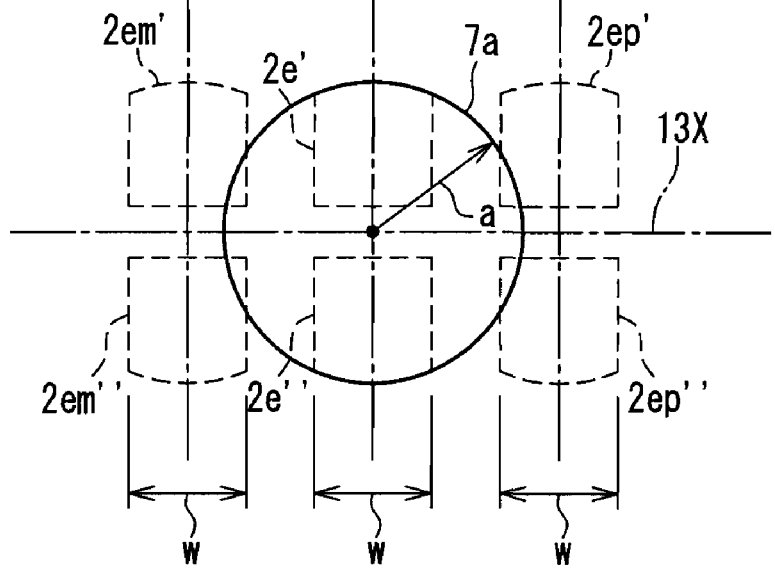

FIG. 4 is a diagram illustrating the optical distribution of light returned from an optical disc on the holographic surface in the optical disc device used in the first embodiment of the present invention, in which (a) illustrates zero-order Gr-diffracted light, and (b) illustrates ±1st order Gr-diffracted light beams (these Gr-diffracted light beams actually overlap). As shown in FIG. 4(a), diffracted light beams 2ep and 2em produced by the guide grooves 8g formed on the signal plane 8a of the optical disc 8 are superimposed upon the light flux (zero order Gr-diffracted light 2e) prior to incidence on the holographic surface 13a while being shifted along the axis 13X, which corresponds to the optical disc radial direction. The amount of the shift is given by $f\lambda/\Lambda$, wherein f is the focal length of the objective lens 7, $\lambda$ is the wavelength of the light, and $\Lambda$ is the pitch of the guide grooves 8g in the optical disc radial direction. It follows that, with respect to light returned to the holographic surface 13a, the portion located outside the aperture of the objective lens 7 gets cut off and, as a result, the returned light is limited to the inside of the circle 7a, which is the outline produced by projecting the aperture of the objective lens 7 onto the holographic surface 13a along the light beam. There are regions (overlap regions) in which the ±1st order groove-diffracted light 2ep, 2em overlap with the zero order Gr-diffracted light 2e. Accordingly, when the light spot 2b goes off-track relative to the guide grooves 8g, the phase information of the groove-diffracted light changes and a light intensity differential is formed between the overlap regions, producing a tracking error signal. In FIG. 4(b), ±1st order Gr-diffracted light beams 2e', 2e" and their +1st order groove-diffracted light beams 2ep', 2ep" and −1st order groove-diffracted light beams 2em', 2em" are incident upon the holographic surface 13a as returned light. The ±1st order groove-diffracted light beams 2ep', 2ep", 2em', 2em" are shifted by $f\lambda/\Lambda$ along the axis 13X relative to the zero order groove-diffracted light. The ±1st order Gr-diffracted light beams 2e', 2e" and their +1st order groove-diffracted light beams 2ep', 2ep" and −1st order groove-diffracted light beams 2em', 2em" have a width of "w" in the direction of the axis 13X, and if the magnitude of w is set to about ⅓ of the radius (aperture radius) a of the circle 7a, the "w" will not exceed ½ of $f\lambda/\Lambda$ no matter what the format of the optical disc is. Accordingly, the ±1st order Gr-diffracted light beams 2e', 2e" do not overlap with their ±1st order groove-diffracted light beams 2ep', 2ep", 2em', 2em" and even if the light spots 2b', 2b" go off-track relative to the guide grooves 8g and the phase information of the groove-diffracted light changes, this does not serve as a tracking error signal. In other words, since the light spots 2b', 2b" on the signal plane 8a may be positioned anywhere with respect to the guide grooves 8g and there is no need to regulate their location relative to the guide grooves 8g, as is conventionally done, the rotational adjustment of the rectilinear gratings 3b, 3c becomes unnecessary.

Figure 5:
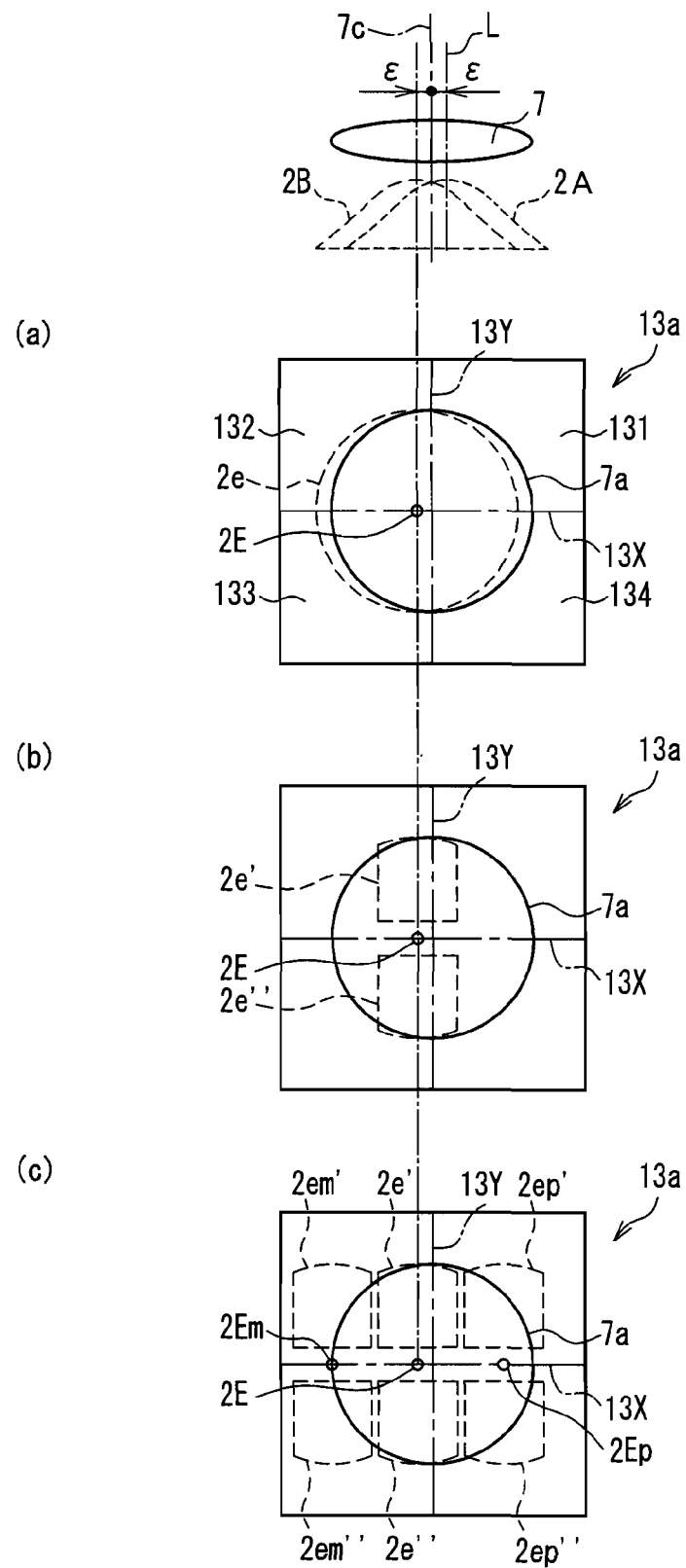
FIG. 5 is a diagram used to explain the offset of the tracking error signal generated by the lens shift of the objective lens in the optical disc device used in the first embodiment of the present invention, where (a) illustrates the optical distribution of zero-order Gr-diffracted light on the holographic surface, (b) illustrates the optical distribution of ±1st order Gr-diffracted light on the holographic surface, and (c) illustrates the optical distribution of groove-diffracted light on the holographic surface.

FIG. 5 is a diagram used to explain the offset of the tracking error signal generated by the lens shift of the objective lens in the optical disc device used in the first embodiment of the present invention, in which (a) illustrates the optical distribution of zero-order Gr-diffracted light on the holographic surface, (b) illustrates the optical distribution of ±1st order Gr-diffracted light on the holographic surface, and (c) illustrates the optical distribution of groove-diffracted light on the holographic surface.

As shown in FIG. 5(a), when the objective lens 7 shifts by $\epsilon$ from the optical axis L in the optical disc radial direction (in the direction of the axis 13X), Gauss-distributed light 2A, which is incident upon the objective lens 7 in a rotationally symmetric manner parallel to the optical axis L, is reflected from the signal plane 8a of the optical disc 8, thereby producing light 2B, whose distribution is shifted by $2\epsilon$ (shifted only by $\epsilon$ relative to the central axis 7c of the objective lens 7). Accordingly, the optical distribution of the zero order Gr-diffracted light 2e on the holographic surface 13a is centered on location 2E shifted by $2\epsilon$. In addition, the portion located outside of the circle 7a, which is the outline of the aperture of the objective lens 7 projected onto the holographic surface 13a along the light beam, is shielded from light. Moreover, since the objective lens 7 and holographic surface 13a are secured together into an integral whole, the location 2E is shifted by $\epsilon$ from the parting line 13Y of the holographic surface 13a. Accordingly, the quantity of light detected by the detection cell 92 exceeds the quantity of light detected in the detection cell 94 and an offset is generated in the tracking error signals obtained by the detection cells 92, 94 (T4−T2). However, since the parting line 13Y of the holographic surface 13a moves together with the objective lens 7, the amount of the offset is approximately ⅓ of that obtained in conventional technology. On the other hand, as shown in FIG. 5(b), the optical distribution of the ±1st order Gr-diffracted light beams 2e', 2e" on the holographic surface 13a is centered on location 2E shifted by $2\epsilon$, and, in addition, the portion located outside of the circle 7a, which is the outline of the aperture of the objective lens 7 projected onto the holographic surface 13a along the light beam, is shielded from light. Accordingly, the quantity of light detected by the detection cell 92' exceeds the quantity of light detected in the detection cell 94' and an offset is generated in the tracking error signals obtained by the detection cells 92', 94' (T4'−T2'). However, while the influence of the shielding provided by the circle 7a is far smaller than that in FIG. 5(a), it does act to increase the amount of offset, and, when normalized for the detected quantity of light, an offset approximately 3.5 times greater than that of FIG. 5(a) is generated, which is approximately 1.1 to 1.2 times greater than that obtained in conventional technology. Then, as far as the tracking error signal TE1 obtained based on the above-mentioned formula (4) is concerned, if the quantity of light of the light spots 2b', 2b" is set to ⅒ of the quantity of light of the light spot 2b, the influence of the lens shift-induced offset can be canceled using a coefficient k with a magnitude of k=5/3.5=1.43, and since no tracking error signal is contained in the signal (T4'−T2'), there is no calculation-induced detection sensitivity deterioration.

It should be noted that the phenomenon whereby the tracking error signal (T4−T2) produced by zero order Gr-diffracted light 2e is influenced by lens shift-induced off-track is limited to DVD-Rs, DVD-RWs, and other optical discs with shallow guide grooves and a small groove pitch, with almost no influence exerted on DVD-RAMs and optical discs with deep guide grooves and a large groove pitch. This is also true with respect to the ±1st order Gr-diffracted light beams 2e', 2e". FIG. 5(c) illustrates the ±1st order Gr-diffracted light beams 2e', 2e" and their groove-diffracted light beams in a DVD-RAM device. As shown in FIG. 5(c), the ±1st order Gr-diffracted light beams 2e', 2e" and their +1st order groove-diffracted light beams 2ep', 2ep" and −1st order groove-diffracted light beams 2em', 2em" are arranged in rows in the direction of axis 13X, with very small gaps therebetween, covering the entire surface of the aperture (circle 7a). The intensities of the groove-diffracted light beams 2ep', 2ep", 2em', 2em" are in register due to diffraction by the guide grooves 8g, which are deep and have a large groove pitch, as a result of which the light intensity in the direction of axis 13X is substantially uniform, and there is almost no lens shift-induced off-track output in the signal (T4'−T2'). Accordingly, the above-mentioned calculation formula (4) can be applied to DVD-RAMs and other optical discs with a large groove pitch.

Moreover, although in the present embodiment tracking error signals are detected based on diffracted light derived from the two quadrants 132, 134 on the holographic surface 13a, arranging the detection cells may allow for the remaining two quadrants to be handled in the same way, permitting detection of tracking error signals using all the quadrants.

Embodiment 2

Figure 6:
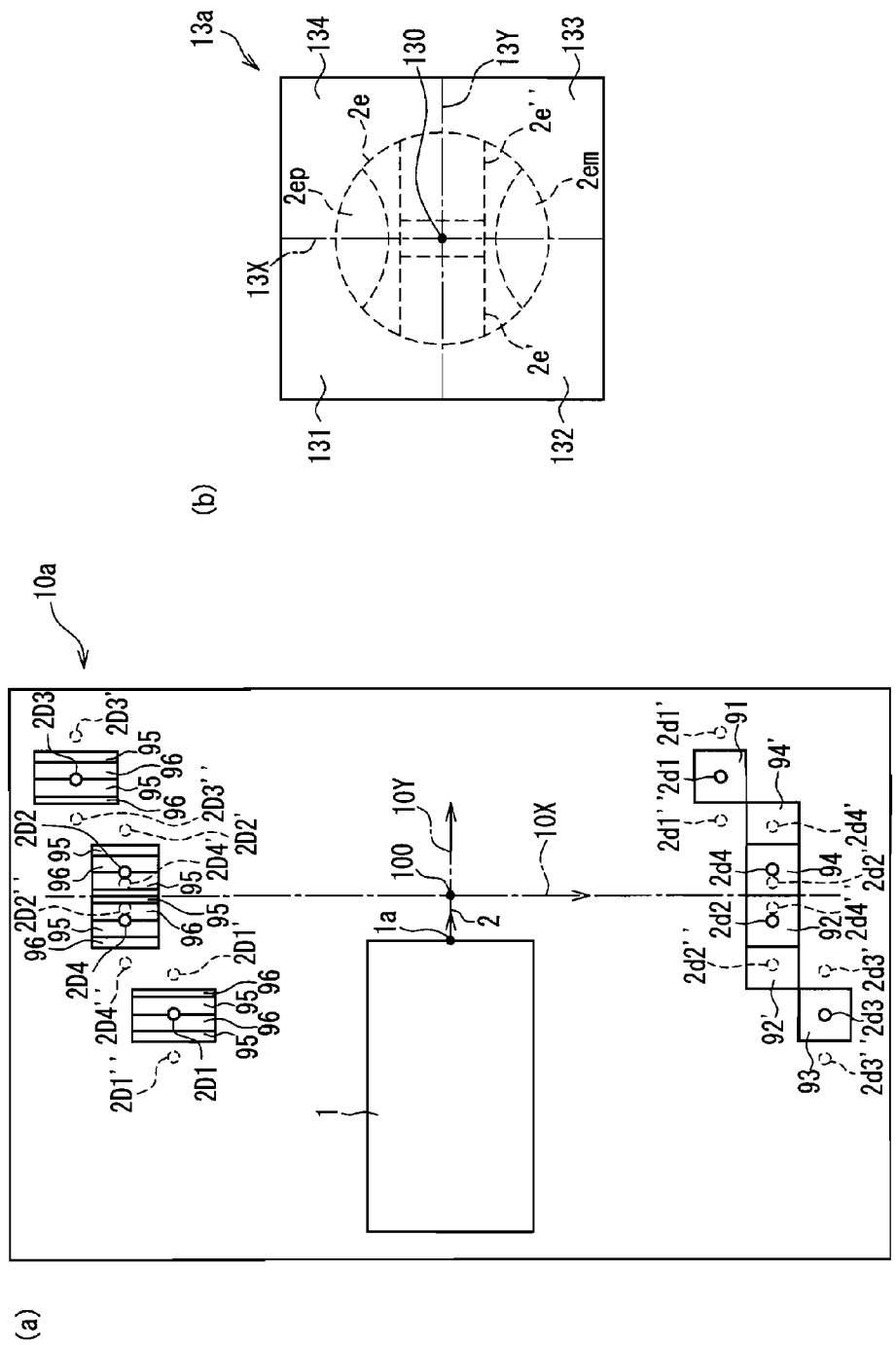
FIG. 6(a) is a diagram illustrating a light detection pattern formed on a light detector used in an optical disc device in a second embodiment of the present invention and optical distribution of returned light on the light detector produced by laser light emitted from the radiation light source.
FIG. 6(b) is a diagram illustrating a hologram configuration used in the optical disc device.

Next, an optical disc device used in the second embodiment of the present invention will be explained with reference to FIG. 1, FIG. 6, and FIG. 7. It should be noted that while the present embodiment differs from the above-described first embodiment in the way light is diffracted by the hologram, it is similar to the above-described first embodiment in terms of other elements and, for this reason, elements identical to those used in the above-described first embodiment are assigned the same reference numerals and their explanation is omitted (FIG. 1 is used both in the present embodiment and in the above-described first embodiment, and its explanation is omitted as well).

FIG. 6(a) is a diagram illustrating a light detection pattern formed on the light detector used in an optical disc device in the second embodiment of the present invention and the optical distribution of returned light on the light detector produced by laser light emitted from a radiation light source, and FIG. 6(b) is a diagram illustrating a hologram configuration used in the optical disc device. FIGS. 6(a) and 6(b) illustrate the light detection surface and holographic surface as viewed from the direction of the optical disc. It should be noted that the ±1 order Gr-diffracted light beams 2e', 2e" on the holographic surface 13a are in the state illustrated in FIG. 1(f).

As shown in FIG. 6(b), two straight lines (13X, 13Y), which intersect at right angles at the intersection point 130 between the holographic surface 13a and optical axis L, divide the holographic surface 13a into four quadrants 131, 132, 133, and 134. The axis 13X is parallel to the optical disc radial direction, with groove-diffracted light beams 2ep and 2em, which are produced by the guide grooves 8g formed on the signal plane 8a of the optical disc 8, being superimposed upon the returned light (zero order Gr-diffracted light 2e) on the holographic surface 13a while being shifted along the axis 13X, which corresponds to the optical disc radial direction. The example illustrated in FIG. 6(b) shows light returned from an optical disc with a narrow-pitch format, such as a DVD-R or DVD-RW, etc., with the outline of the groove-diffracted light shown as a dashed line. When this light passes through the holographic surface 13a, ±1st order diffracted light beams are generated, which are divided among the quadrants 131, 132, 133, and 134 and are incident upon the light detection surface 10a on the light detection substrate 10.

On the other hand, as shown in FIG. 6(a), on the light detection surface 10a, two straight lines intersecting at the intersection point 100 between the optical axis L and light detection surface 10a and parallel to the axis 13X and axis 13Y are used as axis 10X and axis 10Y. Comb-shaped focus detection cells 95, 96 parallel to the axis 10X are arranged in an alternating fashion on the minus side of the axis 10X (cells assigned the same reference numerals are in electrical communication) and square-shaped tracking detection cells 91, 92, 92', 93, 94, and 94' are arranged on the plus side of the axis 10X (light detection pattern). These tracking detection cells 91, 92, 92', 93, 94, and 94' form a shape that is symmetrical when rotated 180 degrees about the center of the boundary line of the tracking detection cells 92 and 94. The tracking detection cells 92, 92', 94, and 94' are arranged in a row in the direction of the axis 10Y while tracking detection cells 91 and 93 are displaced from the row aligned with the axis 10Y in mutually opposed directions along the axis 10X. It should be noted that laser light 2 emitted from the emission point 1a of the radiation light source 1 travels parallel to the axis 10Y in a plane parallel to the paper surface and is reflected by the reflective mirror 12 in the direction of the optical axis L (the direction that goes through point 100 at right angles to the surface of the paper).

In the zero order Gr-diffracted light 2e on the holographic surface 13a, +1st order holographically diffracted light diffracted by the quadrant 131 of the holographic surface 13a is collected into light spot 2d1 located inside the tracking detection cell 91. −1st order holographically diffracted light is collected onto light spot 2D1 straddling a boundary between focus detection cells 95 and 96. +1st order holographically diffracted light diffracted by the quadrant 132 of the holographic surface 13a is collected into light spot 2d2 located inside the tracking detection cell 92. −1st order holographically diffracted light is collected onto light spot 2D2 straddling a boundary between focus detection cells 95 and 96. +1st order holographically diffracted light diffracted by the quadrant 133 of the holographic surface 13a is collected into light spot 2d3 located inside the tracking detection cell 93. −1st order holographically diffracted light is collected onto light spot 2D3 straddling a boundary between focus detection cells 95 and 96. +1st order holographically diffracted light diffracted by the quadrant 134 of the holographic surface 13a is collected into light spot 2d4 located inside the tracking detection cell 94, and −1st order holographically diffracted light is collected onto light spot 2D4 straddling a boundary between focus detection cells 95 and 96.

Moreover, in the +1st order Gr-diffracted light 2e' on the holographic surface 13a, holographically diffracted light diffracted by the quadrant 131 of the holographic surface 13a is collected into light spot 2d1' located outside of the detection cells, and holographically diffracted light diffracted by the quadrant 132 of the holographic surface 13a is collected into light spot 2d2' located inside the tracking detection cell 94. Holographically diffracted light diffracted by the quadrant 133 of the holographic surface 13a is collected into light spot 2d3' located outside of the detection cells, and holographically diffracted light diffracted by the quadrant 134 of the holographic surface 13a is collected into the light spot 2d4' located inside the tracking detection cell 94'. Moreover, in the −1st order Gr-diffracted light 2e" on the holographic surface 13a, holographically diffracted light diffracted by the quadrant 131 of the holographic surface 13a is collected into light spot 2d1" located outside of the detection cells, and holographically diffracted light diffracted by the quadrant 132 of the holographic surface 13a is collected into light spot 2d2" located inside the tracking detection cell 92'. Holographically diffracted light diffracted by the quadrant 133 of the holographic surface 13a is collected into light spot 2d3" located outside of the detection cells, and holographically diffracted light diffracted by the quadrant 134 of the holographic surface 13a is collected into the light spot 2d4" located inside the tracking detection cell 92.

As far as the zero order Gr-diffracted light 2e is concerned, the light spots 2D1, 2D2, 2D3, and 2D4, which are produced by focusing −1st holographically diffracted light diffracted, respectively, by the quadrants 131, 132, 133, and 134 of the holographic surface 13a, are substantially point-symmetrical about point 100 with respect to the light spots 2d1, 2d2, 2d3, and 2d4, which are produced by focusing +1st order holographically diffracted light.

In contrast, as far as the holographically diffracted light beams of the ±1st order Gr-diffracted light beams 2e', 2e" are concerned, in relation to the focusing location of the holographically diffracted light of the zero order Gr-diffracted light 2e, the holographically diffracted light of the +1st order Gr-diffracted light 2e' is collected at a location shifted towards the plus side of the axis 10Y while the holographically diffracted light of the −1st order Gr-diffracted light 2e″ is collected at a location shifted towards the minus side of the axis 10Y.

It should be noted that while the focal lines of the light spots 2D1, 2D2, 2D3, and 2D4 oriented in the direction of axis 10X may be located on either side of the light detection surface 10a (on the rear side (side located farther away from the holographic surface 13a) or on front side (side located closer to the holographic surface 13a)), the focal lines of the light spots 2D1, 2D3 oriented in the direction of axis 10Y are located on the rear side (or front side) of the light detection surface 10a and the focal lines of the light spots 2D2, 2D4 oriented in the direction of axis 10Y are located on the front side (or rear side) of the light detection surface 10a. Moreover, a configuration also is contemplated where each of the quadrants 131, 132, 133, and 134 of the holographic surface 13a is split into strip-shaped regions aligned with the axis 13Y, with holographically diffracted light that is diffracted by every other strip-shaped region being collected on the rear side of the light detection surface 10a and holographically diffracted light that is diffracted by the remaining strip-shaped regions being collected on the front side of the light detection surface 10a.

The methods of signal detection and the definitions of the detection cell names in the present embodiment are the same as in the above-described first embodiment, and their explanations are omitted.

Moreover, the present embodiment is identical to the above-described first embodiment with the exception that the ±1st order Gr-diffracted light beams 2e′, 2e″ extend across the axis 13X and the way light is diffracted by the hologram is different. For this reason, the detection signals produced by the ±1st order Gr-diffracted light beams 2e′, 2e″, under the influence of the lens shift, exhibit an offset that is approximately 3.5 times greater than that of the zero order Gr-diffracted light 2e (when normalized for the detected quantity of light) and, on the other hand, no offset is generated in connection with off-track. Although light spots 2d2, 2d4″ are present inside the tracking detection cell 92 and light spots 2d4, 2d2′ are present inside the tracking detection cell 94, the light spots 2d2 and 2d2′ are constituted by diffracted light generated by the quadrant 132, i.e. the region on the minus side of the axis 13X on the holographic surface 13a, and the light spots 2d4 and 2d4″ are constituted by diffracted light generated by the quadrant 134, i.e. the region on the plus side of the axis 13X on the holographic surface 13a, such that the lens shift-induced offsets have mutually opposed polarity. Accordingly, in the tracking detection cells 92 and 94, the lens shift-related cancellation operation is performed and the influence of lens shift-induced off-track on the signal (T4−T2) obtained in the tracking detection cells 92, 94 can be cancelled to a certain degree. The remaining off-track influence is compensated by the signal (T4′−T2′) obtained in the detection cells 92′ and 94′. The amount of the signal (T4′−T2′) that is detected and compensated is small, which is why the influence of off-track can be cancelled completely using a coefficient k of the same magnitude (k=1-2 or so) as in the above-described first embodiment and there is no calculation-induced deterioration in tracking error signal output. Thus, in accordance with the present embodiment, the same effects can be obtained as in the above-described first embodiment, the light spots 2b′, 2b″ on the signal plane 8a may be positioned anywhere with respect to the guide groove 8g, and there is no need to regulate their location relative to the guide groove 8g, as is conventionally done. As a result, the rotational adjustment of the rectilinear gratings 3b, 3c becomes unnecessary.

It should be noted that, unlike the above-described first embodiment, the reproduction signal detected by the optical disc device of the present embodiment contains signal components read in the light spots 2b′, 2b″ which causes the quality of the reproduction signal (signal read in the light spot 2b) to deteriorate. However, the light spots 2b′, 2b″ on the signal plane 8a comprise three light spots expanded in the optical disc rotation direction and the AC components of the signals generated by the light spots 2b′, 2b″ are for the most part eliminated. Accordingly, the influence exerted by the signal components read in the light spots 2b′, 2b″ on the reproduction signal read in the light spot 2b is minimized sufficiently.

Figure 7:
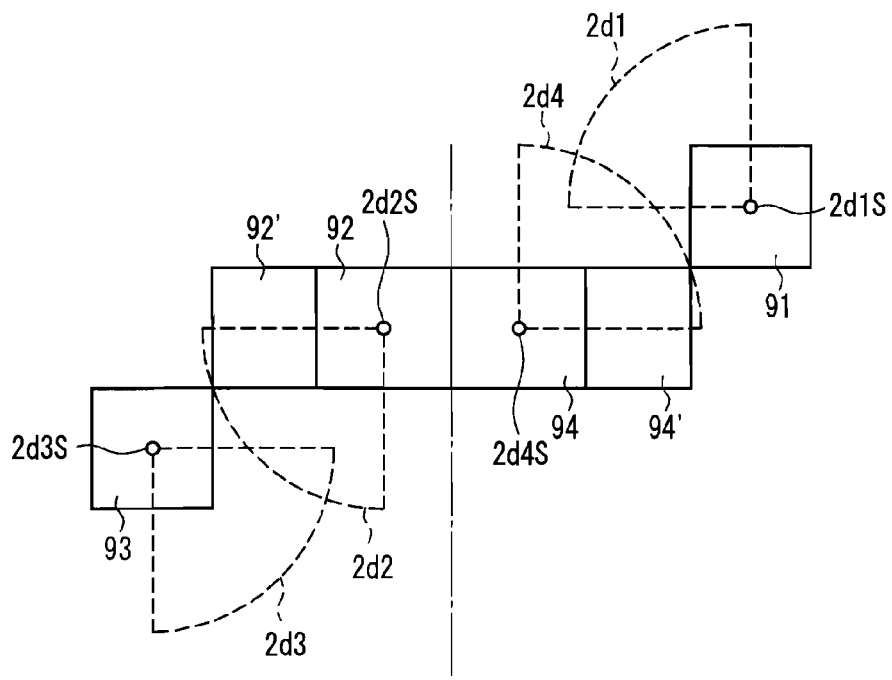
FIG. 7 is a diagram illustrating the distribution of light on the light detection surface obtained when focused light is defocused with respect to the signal plane of the optical disc in the second embodiment of the present invention, where (a) illustrates a case in which the signal plane of the optical disc is located closer to the object lens, and (b) a case in which the signal plane of the optical disc is located farther away from the object lens.
Figure 7:
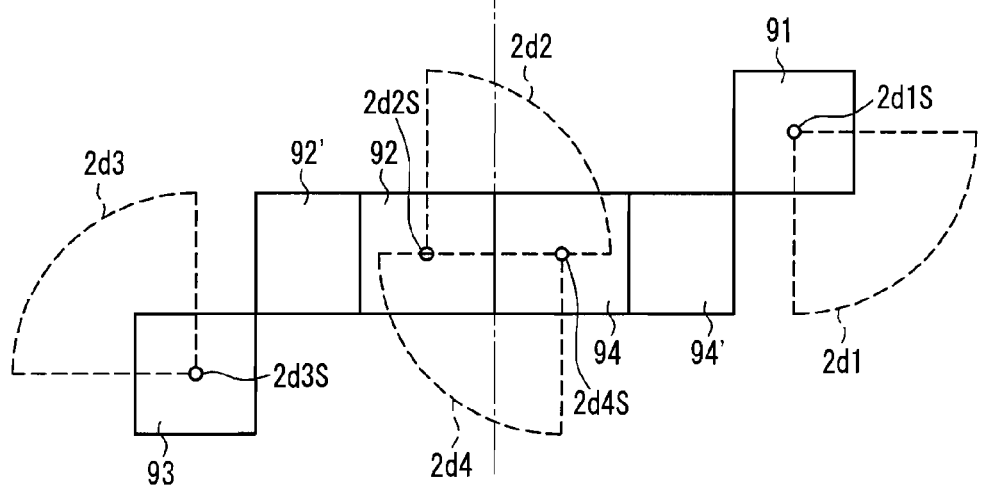
Figure 8:
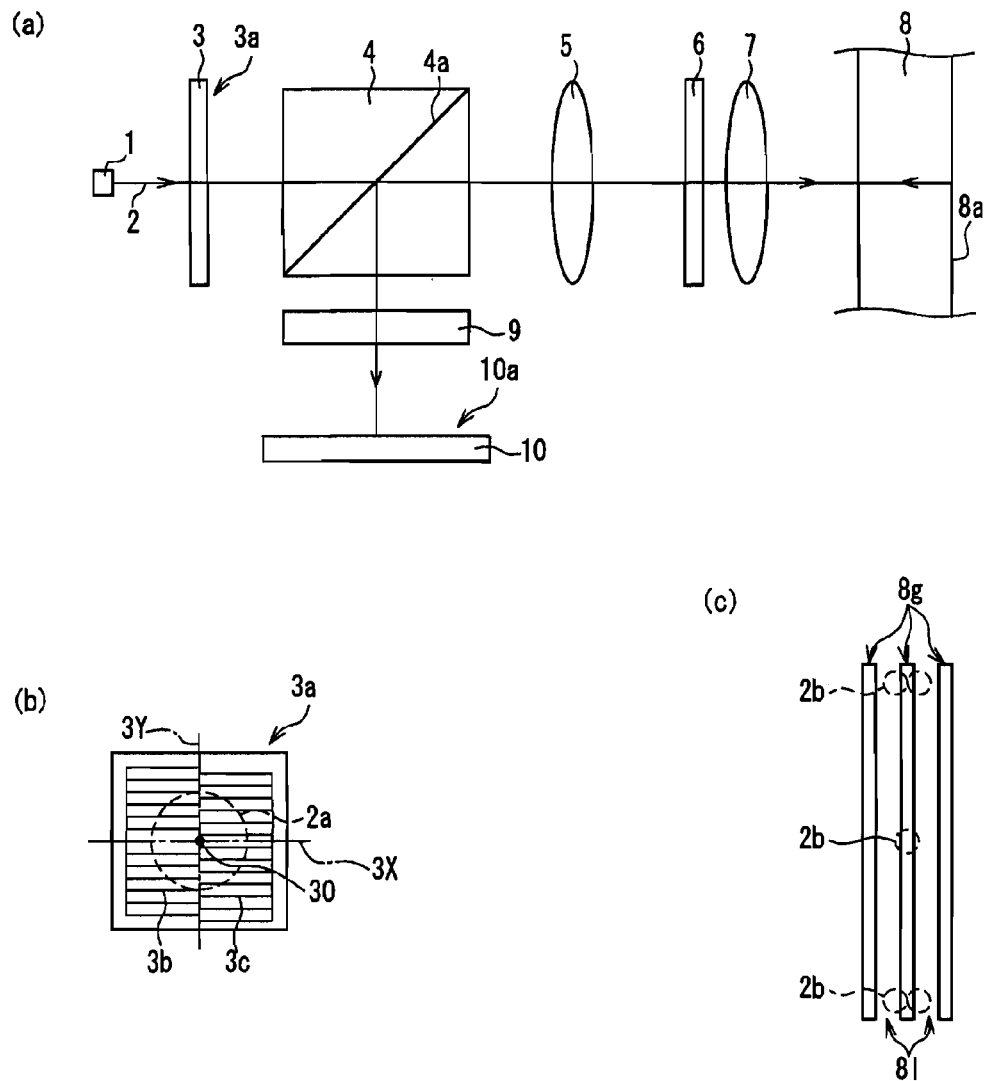
FIG. 8(a) is a side view illustrating a conventional optical disc device.
FIG. 8(b) is a diagram illustrating a grating pattern formed on a grating surface used in the optical disc device and the distribution of light on the grating surface.
FIG. 8(c) is a diagram illustrating the configuration of the signal plane of an optical disc and the distribution of light on the signal plane.
Figure 9:
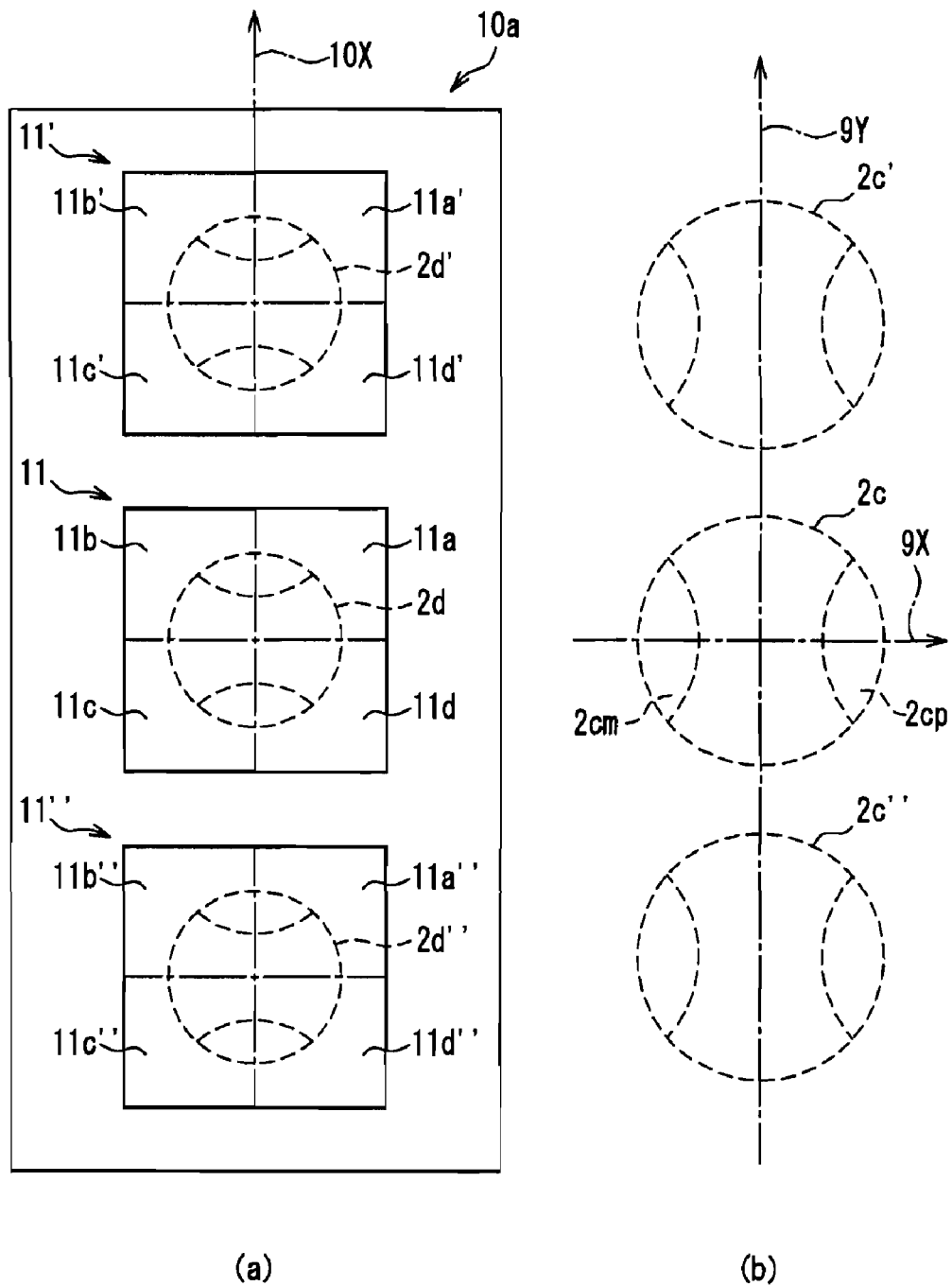
FIG. 9(a) is a diagram illustrating the configuration of a light detection surface used in a conventional optical disc device and the distribution of light on the light detection surface.
FIG. 9(b) is a diagram illustrating light fluxes prior to incidence upon a cylindrical lens used in the optical disc device.
Figure 10:
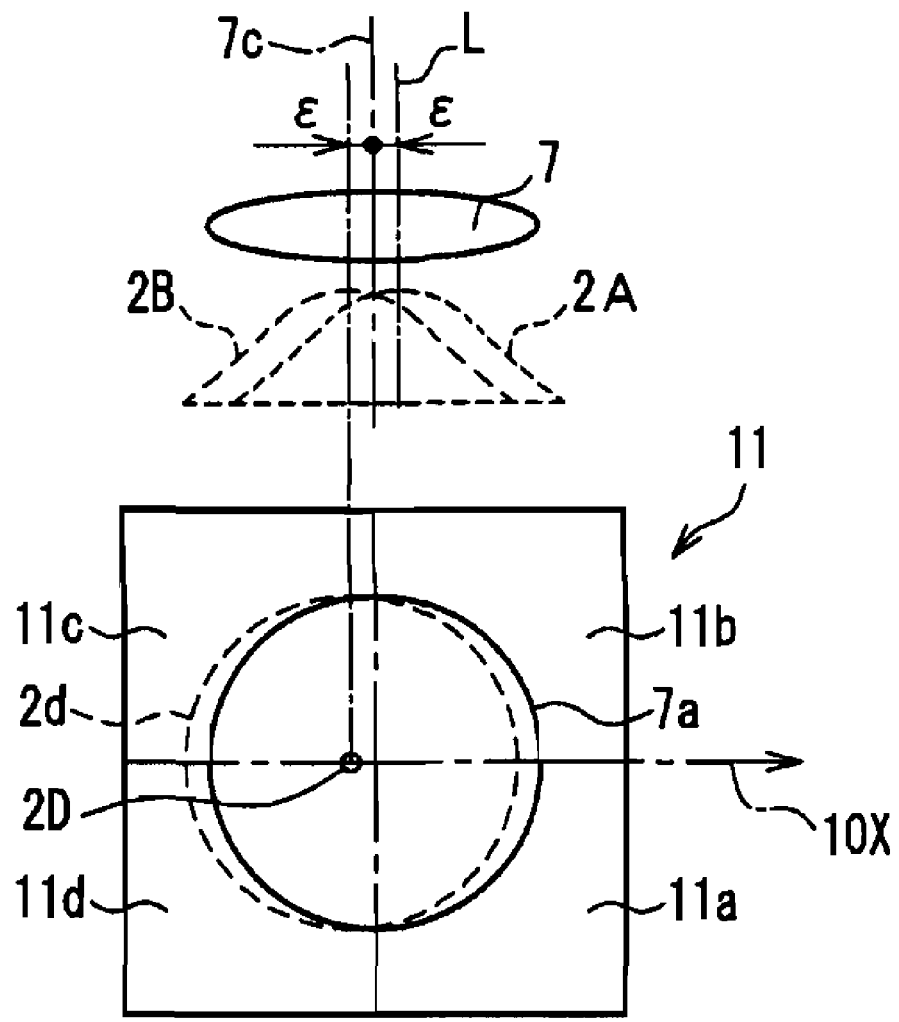
FIG. 10, which is a diagram of a conventional optical disc device, is used to explain the offset of the tracking error signal produced by the lens shift.

FIG. 7 is a diagram illustrating the distribution of light on the light detection side obtained when focused light becomes defocused with respect to the signal plane of the optical disc in the second embodiment of the present invention, where (a) illustrates a case, in which the signal plane of the optical disc is located closer to the object lens, and (b) a case, in which the signal plane of the optical disc is located farther away from the object lens. It should be noted that although FIG. 7 shows light spots only on the side of the +1st order holographically diffracted light, light spots on the side of the −1st order holographically diffracted light are located point-symmetrically about point 100 with respect to the light spots on the side of the +1st order holographically diffracted light. In FIGS. 7(a) and 7(b), optical distributions 2d1, 2d3 do not overlap with the detection cells 92, 92′, 94, and 94′. This is due to the fact that the reference points 2d1S and 2d3S of the optical distributions 2d1 and 2d3 are located in detection cells 91 and 93, which are shifted relative to other detection cells in mutually opposed directions along the axis 10X. Accordingly, in the same manner as in the above-described first embodiment, half of the light spots (2d1, 2d3) do not produce stray light during tracking error detection and the remaining light spots (2d2, 2d4) overlie tracking detection cells while remaining in a symmetrical relationship, as a result of which external perturbations of the tracking error signal TE1 are cancelled. As a result, tracking control in a dual layer disc is stabilized, thereby permitting elimination of off-track and track jumps during tracking control.

INDUSTRIAL APPLICABILITY

As described above, the optical disc device of the present invention is useful as an optical disc device that can be used for recording and reproduction of various optical discs and is capable of cancelling the influence of lens shift-induced off-track without impairing the detected tracking error signal output even without rotational adjustment of the rectilinear gratings.

The invention claimed is:

1. An optical disc apparatus comprising a radiation light source, a diffraction grating formed on a diffraction grating surface, an objective lens, light diverging means and detectors, wherein light emitted from the radiation light source passes through the diffraction grating and is separated into transmitted light a, +1st order diffracted light b, and −1st order diffracted light c;

the transmitted light a, the +1st order diffracted light b, and the −1st order diffracted light c are collected through the objective lens on tracks of a signal plane of the optical disc in a partially overlapped state;

light reflected by the tracks of the signal plane passes through the objective lens and is incident upon the light diverging means, and the light diverging means is split into four areas by a straight line passing through the center of the objective lens and parallel to the direction of rotation of the optical disc and a straight line that intersects that straight line at a right angle;

depending on the location of the light incident upon the light diverging means, light corresponding to the transmitted light "a" diverges into four light components a1, a2, a3 and a4, which are respectively incident upon light detection regions A1, A2 A3 and A4 on the light detectors, light corresponding to the +1st order diffracted light "b" diverges into two light components b1 and b2, which are respectively incident upon light detection regions B1, B2 on the light detectors, and light corresponding to the −1st order diffracted light "c" diverges into two light components c1 and c2, which are respectively incident upon light detection regions C1, C2 on the light detectors;

the light detection regions A1 and A2 are aligned in parallel to the direction of rotation of the optical disc, the light detection regions A3 and A4 are located outside the light detection regions A1 and A2 in the direction of the rotation of the optical disc, while sandwiching the light detection regions A1 and A2 in the radial direction of the optical disc, the light components a1 and a2 are located diagonally to each other on the light diverging means, and the light components a3 and a4 are located diagonally to each other on the light diverging means; and a tracking error signal associated with the tracks of the optical disc is generated by combining signals detected in the light detection regions A1, A2, A3, A4, B1, B2, C1, and C2.

2. The optical disc apparatus according to claim 1, wherein the objective lens and the light diverging means are secured together into an integral whole.

3. The optical disc apparatus according to claim 1, wherein the light detection region B2 is placed in electrical communication with the light detection region A1 in a state multiplied by a constant k, and the light detection region C1 is placed in electrical communication with the light detection region A2 in a state multiplied by a constant k.

4. The optical disc apparatus according to claim 1, wherein the light detection region A1 and light detection region C2 are placed either in electrical communication or are the same light detection region and, in addition, the light detection region A2 and light detection region B1 are placed either in electrical communication or are the same light detection region.

5. The optical disc apparatus according to claim 1, wherein the projection region on the light diverging means corresponding to the +1st order diffracted light b has a width that does not exceed the radius of the objective lens and is aligned with a straight line passing through the center of the objective lens and corresponding to the direction of rotation of the optical disc.

6. The optical disc apparatus according to claim 5, wherein when the aperture of the objective lens is projected onto the diffraction grating surface along a forward-propagating light beam, the diffraction grating areas on the diffraction grating surface have a width that does not exceed the radius of the projected outline of the aperture and are aligned with a straight line passing through the center of the projected outline of the aperture and corresponding to the direction of rotation of the optical disc.

7. The optical disc apparatus according to claim 6, wherein the diffraction gratings are linear gratings aligned with the radial direction of the optical disc.

8. The optical disc apparatus according to claim 6, wherein the diffraction grating areas are located on the outside of the projected outline of the aperture.

9. The optical disc apparatus according to claim 6, wherein the diffraction grating is subdivided into a plurality of strip-shaped regions along straight lines corresponding to the direction of rotation of the optical disc such that the ridges and valleys of the diffraction gratings in every other strip-shaped region are coordinated and the ridges and valleys of the diffraction gratings in the adjacent strip-shaped regions are shifted by ⅕–½ pitch.

10. The optical disc apparatus according to claim 1, wherein the tracking error signal associated with the tracks of the optical disc is calculated as $\Delta T1 - k \times (\Delta T2 + \Delta T3)$, where $\Delta T1$ is the difference between the signals detected in the light detection regions A1 and A4 and the light detection regions A2 and A3, $\Delta T2$ is the difference between the signals detected in the light detection regions B1 and B2, and $\Delta T3$ is the difference between the signals detected in the light detection regions C1 and C2, and k is a coefficient.

11. The optical disc apparatus according to claim 4, wherein the tracking error signal associated with the tracks of the optical disc is calculated as $\Delta T1 - k \times \Delta T4$, where $\Delta T1$ is the difference between the signals detected in the light detection regions A1 and A4 and the light detection regions A2 and A3, $\Delta T4$ is the difference between the signals detected in the light detection regions B2 and C1, and k is a coefficient.

* * * * *